United States Patent Office 3,057,826
Patented Oct. 9, 1962

3,057,826
COPOLYESTERS HAVING CARBOXYLATE SALT GROUPS
John Malcolm Griffing, Kinston, N.C., assignor to E. I. du Pont de Nemours and Company, Wilmington, Del., a corporation of Delaware
No Drawing. Filed Dec. 21, 1959, Ser. No. 860,655
7 Claims. (Cl. 260—75)

This invention relates to a film- and fiber-forming synthetic copolyester and the shaped articles produced therefrom. More particularly it is concerned with a fiber-forming copolyester containing a minor proportion of a basic dye sensitizing unit as defined hereinafter and the shaped articles formed therefrom.

It is an object of the present invention to provide a shaped article produced from a copolyester, the said article having affinity for basic type dyes.

Another object is to provide a process for the production of a copolyester from which shaped articles having affinity for basic type dyes can be prepared.

These and other objects will become apparent in the course of the following specification and claims.

The polymer of the present invention is useful in the production of shaped articles by extrusion, molding, casting or the like. These shaped articles in turn may be formed into yarns, fabrics, pellicles, ornaments, or the like.

In accordance with the present invention a film or fiber-forming copolyester is prepared from linear polyester-forming compounds from the class consisting of a lower alkyl ester of a monohydroxymonocarboxylic acid; a lower alkyl diester of a dicarboxylic acid with a compound of the class consisting of an aliphatic glycol and a diester of an aromatic diol; and as an essential component a minor amount of a compound of the formula

wherein $n$ is a small integer, —X— is an atomic equivalent of a metal,

is an organic radical, —Z— and —Z'— are the same or different members of the class consisting of —O— and

and —Y and —Y' are —lower alkyl, —H and

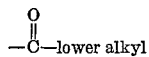

with the proviso that when a member of —Z— and —Z'— is

its attached terminal member —Y and —Y' is —lower alkyl whereas when a member of —Z— and —Z'— is —O—, its attached terminal member —Y and —Y' is other than —lower alkyl and with the further proviso that when a member of —Z— and —Z'— is —O— and is attached to a carbon atom in an aromatic ring, its attached terminal member —Y and —Y' is

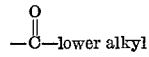

A preferred class is prepared from a dialkyl ester of terephthalic acid and a polymethylene glycol having the formula $$HO(CH_2)_mOH \qquad (b)$$

wherein $m$ is an integer of from 2 to about 10, in the presence of at least about 0.5 mol percent, based on the terephthalate content of the polyester, of a compound of Formula $a$ as shown above.

The product comprises a modified carbonyloxy-copolyester wherein the carbonyloxy linkages are an integral part of the polymer chain, preferably wherein at least about 75% of the repeating units contains a carbocyclic ring, the modifier consisting essentially of, as an integral part of the polymer chain and as a mid-chain unit, a minor proportion of organic radicals containing at least one metallic salt of a carboxylic acid. Thus, the final product will contain recurring units of the structure

where the symbols —Z—, —Z'—,

—X— and $n$ are as defined above. Those derivatives in which $n$ is 1 or 2 are preferred. When $n$ is greater than 1, the carboxylate salt groups are preferably attached to different carbon atoms in

The following examples are cited to illustrate the invention. They are not intended to limit it in any manner.

The intrinsic viscosity of the polymer is used herein as a measure of the degree of polymerization of the polymer and may be defined as:

$$\text{limit } \frac{ln\eta_r}{C} \text{ as } C \text{ approaches } 0$$

wherein $\eta_r$ is the viscosity of a dilute solution of the polymer in a solvent divided by the viscosity of the solvent per se measured in the same units at the same temperature; and C is the concentration in grams of the polymer per 100 ml. of solution. Fomal, which comprises 58.8 parts by weight of phenol and 41.2 parts by weight of trichlorophenol, is a convenient solvent for measuring the intrinsic viscosity of linear polyesters, and intrinsic viscosity values reported herein are with reference to Fomal as a solvent. A value above about 0.2 indicates the polymer of the class defined herein to be film-forming, while above 0.3 it is spinnable. All dyeings are performed by immersion at 125° C., in a 3% aqueous solution of the dye, based on fabric treated, for one hour.

EXAMPLE I

To a stirred refluxing solution of 201.7 parts of trimethyl trimesate in 2 liters of methanol, a solution of 56.1 parts of 85% potassium hydroxide in 200 ml. methanol is added in portions over a period of 90 minutes. Reflux is maintained for 5 hours, after which the mixture is cooled to room temperature, and the precipitate is collected by filtration. A second crop of crystals is obtained by addition of ether to the filtrate. The combined crops are then recrystallized from boiling water. The product, which melts above 300° C., is potassium dimethyl trimesate. The sodium salt is similarly prepared substituting equivalent amounts of sodium hydroxide for the potassium hydroxide. The lead salt is prepared by treating a solution of the potassium salt with a solution of lead acetate.

1.1 parts of potassium dimethyl trimesate are added to 45.4 parts of dimethyl terephthalate, 30.6 parts of ethylene glycol, 0.0204 part of manganous acetate, and 0.0136 part of antimony trioxide. This represents about 2 mol percent of the trimesate salt based on dimethyl terephthalate. Methanol is removed from the reaction mixture at 165–220° C. during 3.5 hours, following which the mixture is heated at 285° C. under 1 mm. of mercury for 5 hours. The polymer formed has an intrinsic viscosity of 0.70. It is spun at 290–300° C. from a 34-hole spinneret having an orifice diameter of 0.009 inch. The yarn is drawn 1.6 times its extruded length.

Skeins of this yarn are dyed with a basic dye of the oxazine type having the following chemical structure:

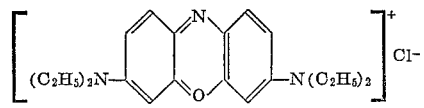

The solution has a pH of 7.0. The skeins are dyed to a medium shade of blue.

A comparative control sample of polyethylene terephthalate yarn is prepared following the above instructions, except that 46.2 parts of dimethyl terephthalate is used and no potassium dimethyl trimesate is added. Skeins of the control yarn, when dyed with the same basic dye have only a faint blue color.

Substitution of sodium dimethyl trimesate and lead dimethyl trimesate for the potassium salt produces polyesters having similarly enhanced dyeability with basic dyes.

A second comparative control is produced wherein potassium monomethyl terephthalate is substituted for the potassium dimethyl trimesate in the polymerization detailed above. The product contains 2 mol percent, based on terephthalic acid diester, of modifier. However, in this case the modifier assumes end chain positioning as opposed to the mid-chain positioning of the example. The yarn is dyed only a pale shade with Fuchsine SBP dye (C.I. 676), a basic dye of the triphenyl methane type. The same dye produces a deep color upon the yarn produced in accordance with the invention. A similar differential in dye intensity is noted using Victoria Pure Blue BO dye (Pr. No. 198). When an attempt is made to increase modification employing "end chain" carboxylate salts, the viscosity of the polymer is held below the level at which useful fibers can be spun from the melt. The effect occurs at concentrations as low as 5% of "end chain" carboxylate salt, based on the weight of the dicarboxylic acid diester.

EXAMPLE II 2.02 parts of the potassium salt of desoxycholic acid, $(HO)_2C_{23}H_{37}COOK$, is added, in place of the potassium dimethyl trimesate, to the polymerization reactants of Example I. Methanol is removed from the reaction mixture at 165–220° C. during 3 hours, following which the mixture is heated at 275° C. under 1 mm. of mercury for 5 hours. The polymer formed has an intrinsic viscosity of 0.540. It is spun at 290° C. through a 34-hole spinneret having an orifice diameter of 0.009 inch. The yarn, after being drawn about 2.28 times its extruded length is 80 denier and has a tenacity of 1.8 grams per denier.

A swatch of knit tubing prepared from the above yarn is dyed a medium shade of bluish red with Fuchsine SBP dye.

A comparative control sample of unmodified polyethylene terephthalate is dyed only a faint shade of pink with the same dye.

When the lithium, calcium and lanthanum salts of desoxycholic acid are substituted for potassium desoxycholate in the above example, a polyester having high sensitivity to basic dyes is produced.

A copolyester of similar high sensitivity to basic dyes is produced by employing a reaction mixture consisting of 2.02 parts of the potassium salt of desoxycholic acid, 40 parts of dimethyl terephthalate, 5.4 parts of dimethyl isophthalate, 30.6 parts of ethylene glycol, 0.0204 part of manganous acetate, and 0.0136 part of antimony trioxide in accordance with the procedure of Example I. Another such copolyester is produced from a mixture of 34.1 parts of dimethyl terephthalate, 15.1 parts of dimethyl sebacate, 30.6 parts ethylene glycol and 2.02 parts of the potassium salt of desoxycholic acid in the same manner and employing the same catalyst.

EXAMPLE III 3.04 parts of potassium diethyl trimesate are added to 95.06 parts of dimethyl terephthalate, 90.5 parts of butanediol-1,4, and 0.0425 part of manganous acetate·2.5H$_2$O, the ratio of the carboxylate salt to dimethyl terephthalate being about 2 mol percent. Methanol is removed from the reaction mixture at a temperature increasing from about 175 to 200° C. over a three-hour interval, following which 0.002 part of tetraisopropyl titanate is added and the mixture is polymerized at 240° C. and 1 mm. of mercury for one hour. The resulting polymer has an intrinsic viscosity of 0.46. A thin film pressed from this polymer is treated for two hours at 100° C. with an aqueous solution of 1% (based on the weight of the film) of the basic dye having the structure shown in Example I. The film is dyed a medium shade of blue having excellent wash-fastness.

A control sample of polybutylene terephthalate film is prepared following the above instructions, except that 97 parts of dimethyl terephthalate is used and no potassium diethyl trimesate is added. The resulting polymer has an intrinsic viscosity of 0.40. Film pressed from this polymer, when subjected to the same dye bath conditions described above, adsorbs only a faint tint of the dye.

EXAMPLE IV 3.04 parts of potassium diethyl trimesate are added to 98 parts of dimethyl hexahydroterephthalate, 66 parts of ethylene glycol, 0.0425 part of manganous acetate, and 0.0284 part of antimony trioxide. The ratio of the carboxylate salt to dimethyl hexahydroterephthalate is accordingly about 2 mol percent. Methanol is removed from the reaction mixture as the temperature is raised from about 190–220° C. over a two-hour period. Polymerization is then continued at 275° C. under 1 mm. of mercury for two hours, resulting in a polymer having an intrinsic viscosity of 0.50. The polymer is pressed into thin films onto a backing a satin-faced ribbon prepared from unmodified polyethylene terephthalate yarn. When the film is treated for two hours at 100° C. with an aqueous solution of 1% (based on the weight of the film) of the basic dye having the structure shown in Example I, it is dyed a light shade of blue.

A control sample of polyethylene hexahydroterephthalate is prepared following the above instructions, except that 100 parts of dimethyl hexahydroterephthalate is used and no potassium diethyl trimesate is used. The resulting polymer has an intrinsic viscosity of 0.64. Thin films of the polymer pressed onto a backing of polyethylene terephthalate satin-faced ribbon adsorb only a faint blue tint of color when subjected to the dye bath conditions described above.

EXAMPLE V 0.69 part of potassium diethyl trimesate is added to 15 parts of methyl p-(2-hydroxyethoxy) benzoate and 0.05 part of tetraisopropyl titanate, the ratio of the carboxylate salt to the benzoate ester being about 3 mol percent. The mixture is polymerized at 240° C. and 0.5 mm. of mercury for 1.5 hours, resulting in a polymer having an intrinsic viscosity of 0.20. A film pressed from this polymer is treated for two hours at 100° C. with an aqueous solution of 1% (based on the weight of the film) of the basic dye having the structure shown in Example I. The film is dyed a deep shade of blue, and the film retains its deep blue color after repeated scourings in hot water and in hot chlorobenzene and other organic solvents.

A control sample of polyethylene p-oxybenzoate is prepared following the above instructions, except that no potassium diethyl trimesate is used. The resulting polymer has an intrinsic viscosity of 0.18. Films prepared from the unmodified polymer, when dyed under the conditions described above, exhibit a medium blue color; however, scourings in hot water or in hot chlorobenzene and other organic solvents leach the dye from the film, leaving the film with only a faint blue color.

EXAMPLE VI 1.82 parts of sodium 3,5-dihydroxycyclohexanecarboxylate is added to 97 parts of dimethyl terephthalate, 151 parts of p-hexahydroxylylene glycol, and 0.08 part of tetraisopropyl titanate. The ratio of the carboxylate salt to dimethyl terephthalate is accordingly about 2 mol percent. Methanol is removed from the reaction mixture as the temperature is raised from about 135 to 230° C. over a three-hour period. Polycondensation is then carried out at 280° C. under 1 mm. of mercury for 3 hours to a fiber-forming stage. A thin film pressed from this polymer is dyed a medium shade of bluish red with Fuchsine SBP dye.

A control sample of poly(p-hexahydroxylylene terephthalate) is prepared following the above instructions, except that no sodium 3,5-dihydroxycyclohexanecarboxylate is used. Thin films pressed from the polymer are dyed only a pale shade of pink with Fuchsine SBP dye.

EXAMPLE VII 4.2 parts of calcium methyl 4-hydroxypimelate, $Ca(OOCCH_2CH_2CHOHCH_2CH_2COOCH_3)_2$, is added to 122 parts of dimethyl 2,6-naphthalenedicarboxylate, 69 parts of ethylene glycol, 0.0425 part of manganous acetate, and 0.0284 part of antimony trioxide. The ratio of the 4-hydroxypimelate to the 2,6-naphthalenedicarboxylate is accordingly about 4 mol percent. Methanol is removed from the reaction mixture as the temperature is raised from about 150° to 230° C. over a three-hour period. Polycondensation is then carried out at 280° C. under 1 mm. of mercury for 3 hours to a fiber-forming stage. A thin film pressed from this polymer is treated for two hours at 100° C. with an aqueous solution of 3% (based on the weight of the film) of the basic dye having the structure shown in Example I. The film is dyed a medium shade of blue having excellent wash-fastness.

A control sample of polyethylene 2,6-naphthalenedicarboxylate is prepared following the above instructions, except that no calcium methyl 4-hydroxypimelate is added. Film pressed from this polymer, when subjected to the same dye bath conditions described above, adsorbs only a faint tint of the dye.

EXAMPLE VIII

In each of a series of experiments, the indicated number of parts of the carboxylate salt modifiers of Table I is added to 49 parts of dimethyl terephthalate, 34.5 parts of ethylene glycol, 0.021 part of manganous acetate, and 0.015 part of antimony trioxide. In each case the ratio of the carboxylate salt to dimethyl terephthalate is about 2 mol percent. Methanol is removed from the reaction mixture as the temperature is raised from 165° C. to 220° C. during about 3 hours, following which the mixture is heated in each case at 285° C. under 1 mm. of mercury for 5 hours. The polymers formed are of fiber-forming molecular weight. Skeins of yarn spun from the polymers, when dyed with the oxazine dye of Example I, are dyed in each case to medium shades of blue. As noted in Example I, skeins of control yarn of unmodified polyethylene terephthalate are dyed only a faint blue color by the same dye.

TABLE I

*Carboxylate Salt Modifiers Polymerized With Dimethyl Telephthalate and Ethylene Glycol*

Parts modifier:
- 1.8 Cesium dimethyl methanetriacetate
- 1.3 Sodium diethyl cyclopropanetricarboxylate
- 2.2 Potassium dimethyl triphenylmethanetricarboxylate (4,4′,4″)
- 0.75 Strontium glycerate
- 1.0 Barium 4,5-dihydroxyvalerate
- 0.9 Sodium methyl 3-hydroxyglutarate
- 1.7 Sodium dibutyl ethanetriacetate (1,1,1)
- 1.8 Zinc 9,10-dihydroxystearate
- 1.8 Calcium 9,10-dihydroxystearate
- 1.9 Sodium 3,5-diacetoxybenzoate
- 1.1 Lithium ethyl 4-hydroxypimelate
- 1.0 Cadmium 2,2-bis(hydroxymethyl) propionate
- 0.9 Lanthanum 2,2-bis(hydroxymethyl) propionate As is illustrated in the examples, when it is desired to introduce a mid-chain metallic salt carboxylate group, a compound of the formula

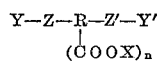

where the units are as defined previously, is introduced into the ester interchange reaction together with the compounds useful in making a linear, film- or fiber-forming polyester. The modifying additive may be introduced at any stage of polymerization. Generally, it is preferred that the additive be included among the initial polymerization reactants. However, when the dicarboxylic component of the polyester is introduced in the form of the free acid or acid halide, the carboxylate salt additive should be introduced late during polymerization to minimize equilibration or reaction of the carboxylate radical in the carboxylate salt modifier with the free carboxylic acid or acid halide, thus minimizing cross linking. As exemplified a metallic salt of a diesterified tricarboxylic acid and a metallic salt of a dihydroxy monocarboxylic acid (where the hydroxyl groups are attached to a nonaromatic carbon atom) are suitable. Where the hydroxyl groups are attached to aromatic carbon, they are acylated, preferably with a lower fatty acid, prior to addition to the ester interchange reaction. Some examples of carboxylate salt additives which may be employed are sodium dimethyl trimesate, lithium desoxychloate, dipotassium dimethyl diphenyl-2,4,2′,4′-tetracarboxylate, sodium dimethyl pentane-1,2,5-tricarboxylate rubidium dimethyl butane-1,2,4-tricarboxylate, sodium dimethyl tricarballylate, potassium diethyl cyclopentane-1,2,4-tricarboxylate, sodium dipropyl hexahydrotrimesate, sodium dimethyl trimellitate, sodium dimethyl 2-chloro-1,3,5-trimesate, sodium dimethyl 6-bromotrimellitate, sodium dimethyl 2-methoxytrimesate, sodium diethyl naphthalene-1,2,7-tricarboxylate, manganese 2,4-dihydroxybutyrate, magnesium 3,4-dihydroxylaurate, calcium 3,4-dihydroxyadipate, sodium dimethyl 2,4-dicarboxyphenyl 4′-carboxyphenyl sulfone, disodium dimethyl methanetetraacetate, and sodium monomethyl 4-hydroxyazelate. In general, compounds containing functional groups other than the ester-forming groups and carboxylate groups will be avoided. However, substituents may be present if they are relatively inert in the polycondensation reaction; thus, the modifier may contain halogen substituents or ether groups. The alkali salt is preferred. However, the carboxylate salts of alkaline earth metals and other metals may also be used. It is not necessary that the metal be univalent. In cases in which the carboxylate salt is highly insoluble, fine dispersion of the additive may be required during the early stages of the reaction. Metals, such as iron or copper which normally exhibit color in their salts may, if used in the carboxylate additives, contribute a pale color to the polymer.

The carboxylate-salt modified polyesters are relatively stable in the melt and may be heated for long periods if this is required for some reason. Despite the presence of the metallic carboxylate salts, the melt viscosity of the polyester is at a normal level with relation to its relative viscosity, so that it is not necessary to spin at unusualy high melt viscosities in order to obtain fibers having normal physical properties.

The modifying unit of the present invention, which carries one or more carboxylic acid salt groups, is a midchain unit, i.e., it is attached within the polyester chain by two ester linkages. As shown in the examples, polyesters modified with carboxylate-carrying end-chain units only are not suitable for the purposes of the present invention. In some cases it may be desirable to prepare polyesters containing both mid-chain and end-chain units, but the presence of mid-chain units is essential for dyeability in deep shades.

Preferably the modified polymers contain at least about 0.5 mol percent of mid-chain modifying units, based on the number of mols of recurring ester structural units (such as the recurring ethylene terephthalate structural unit in polyethylene telephthalate). Polyesters containing less than 0.5 mol percent of the mid-chain carboxylate-carrying units will usually have only a relatively low affinity for basis dyes. Poyesters containing about 10 mol percent of mid-chain carboxylate modifier have a very high affinity for basic dyes. Higher concentrations do not lead to appreciable increases in basic dyeability. Concentrations of 1 to 5 mol percent of the carboxylate modifier are regarded as optimum and are preferred. The carboxylate-salt modified polyesters of the present invention are substantially colorless or white, an important requirement when the polymer is prepared for textile end uses.

Modified polyethylene terephthalate is the preferred species of the invention. Other fiber-forming, water-insoluble polyesters, which may be modified in accordance with the present invention with a modifier or modifiers as described herein as well as mixtures thereof, are polyethylene bibenzoate, prepared by condensing ethylene glycol with p,p'-bibenzoic acid; polyethylene 1,5- or 2,7-naphthalenedicarboxylate, prepared by condensing ethylene glycol with dimethyl 1,5- or 2,7-naphthalenedicarboxylate; poly(p,p'-isopropylidene diphenyl isophthalate), prepared by condensing diphenylolpropane with diphenyl isophthalate; polyhexamethylene adipate, prepared by condensing hexamethylene glycol with diethyl adipate; and polyethylene sebacate, prepared by condensing ethylene glycol with dimethyl sebacate. The invention is applicable as well to polyesters produced by the self-condensation of monohydroxy carboxylates, such as ethyl 4-(beta-hydroxyethoxy)-3-methylbenzoate. The additives may also be incorporated into copolyesters, prepared by reacting a glycol with a mixture of dicarboxylic esters or a dicarboxylic ester with a mixture of glycols. Preferred fiber-forming linear condensation polyesters are those in which the solidified polyester fibers remain tenacious when immersed in water at 100° C. Fibers which dissolve, melt, or become quite soft in boiling water obviously have relatively little utility as textile fibers which are intended to be dyed, since nearly all commercial textile dyeing operations are carried out in water at or above 100° C. The modified polyesters are highly useful as dyeable textile fibers when spun in accordance with known methods. They may also be extruded into films which are highly receptive to basic coloring materials in printing or dyeing. Ribbons and other useful shaped articles may also be prepared by known methods.

Various other materials may be present in the reaction mixture. For example, such ester interchange catalysts as salts of calcium, manganese, or lanthanum and such polymerization catalysts as antimony oxide will usually be present. Color inhibitors, such as phosphoric acid and its alkyl or aryl esters, may be used. In addition, pigments, delusterants, or other additives may be present, such as titanium dioxide or barium carbonate.

The yarns produced from the polymer of the present invention are suitable for the usual textile applications. They may be employed in the knitting or weaving of fabrics of all types as well as in the production of nonwoven, felt-like products produced by known methods. Their physical properties closely parallel those of their related polyester fibers. However, they have particular sensitivity toward basic dyes. By a "basic dye" is meant a colored cationic organic substance such as those containing sulfonium, oxonium, or quaternary ammonium functional groups. Among the basic dyes which may be applied to the filament formed in accordance with the present invention may be mentioned Victoria Green WB (C.I. 657); Rhodamine B (C.I. 749); Brilliant Green B (C.I. 662); Victoria Pure Blue BO (Pr. 198); and the like.

Many equivalent modifications of the above will be apparent to those skilled in the art from a reading of the above without a departure from the inventive concept.

This application is a continuation-in-part of application Serial No. 667,271, filed June 21, 1957.

What is claimed is:

1. A synthetic linear condensation copolymer capable of orientation along the fiber axis when in fiber form, consisting essentially of a carbonyloxy polyester wherein the carbonyloxy linkages are an integral part of the polymer chain, with the proviso that in at least about 75 mol percent of the repeating ester units in the said polyester, there is present as an integral part of the polymer chain at least one divalent carbocyclic hydrocarbon ring containing at least six carbons, the said polyester having an intrinsic viscosity of at least about 0.2 in a mixture of 58.8 parts of phenol and 41.2 parts of trichlorophenol and the said polyester containing as an integral part of the polymer chain from about 0.5 mol percent to about 10 mol percent, based on the acidic component of the said polyester, of a metallic salt of the structure

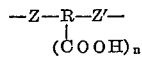

wherein

is selected from the group consisting of hydrocarbon, halohydrocarbon, hydrocarbylsulfonylhydrocarbon, and alkoxyhydrocarbon; —Z— and —Z'— are members of the class consisting of

and —O— attached to carbon of

with the further proviso that when either of —Z— or —Z'— is —O—, the carbon of

to which it is attached is saturated, and $n$ is an integer of less than 3; the remainder of the radicals of the said polyester, to which —Z— and —Z'— are attached and which are joined by the said carbonyloxy linkages, are selected from the group consisting of (1) divalent hydrocarbon radicals and (2) carbocyclic hydrocarbon radicals joined through oxaalkylene to the said carbonyloxy linkages.

2. The polyester of claim 1 in the form of a fiber.

3. The polyester of claim 1 in the form of a film.

4. The copolymer of claim 1 wherein —Z— and —Z'— are each —O—.

5. The copolymer of claim 1 wherein —Z— and —Z'— are each

6. The copolymer of claim 1 wherein
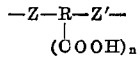
is
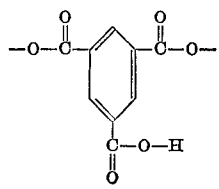
7. The polyester of claim 6 wherein the metal salt is a potassium salt.
References Cited in the file of this patent
UNITED STATES PATENTS
| | | | |
|---|---|---|---|
| 2,437,232 | Rothrock | Mar. 2, | 1948 |
| 2,450,627 | Bloch | Oct. 5, | 1948 |
| 2,517,563 | Harris | Aug. 8, | 1950 |
| 2,522,586 | Silver | Sept. 19, | 1950 |
| 2,655,263 | Howald | Jan. 5, | 1954 |
| 2,683,135 | Bloch | July 6, | 1954 |
| 2,900,356 | Arndt | Aug. 18, | 1959 |